United States Patent Office 3,537,683
Patented Nov. 3, 1970

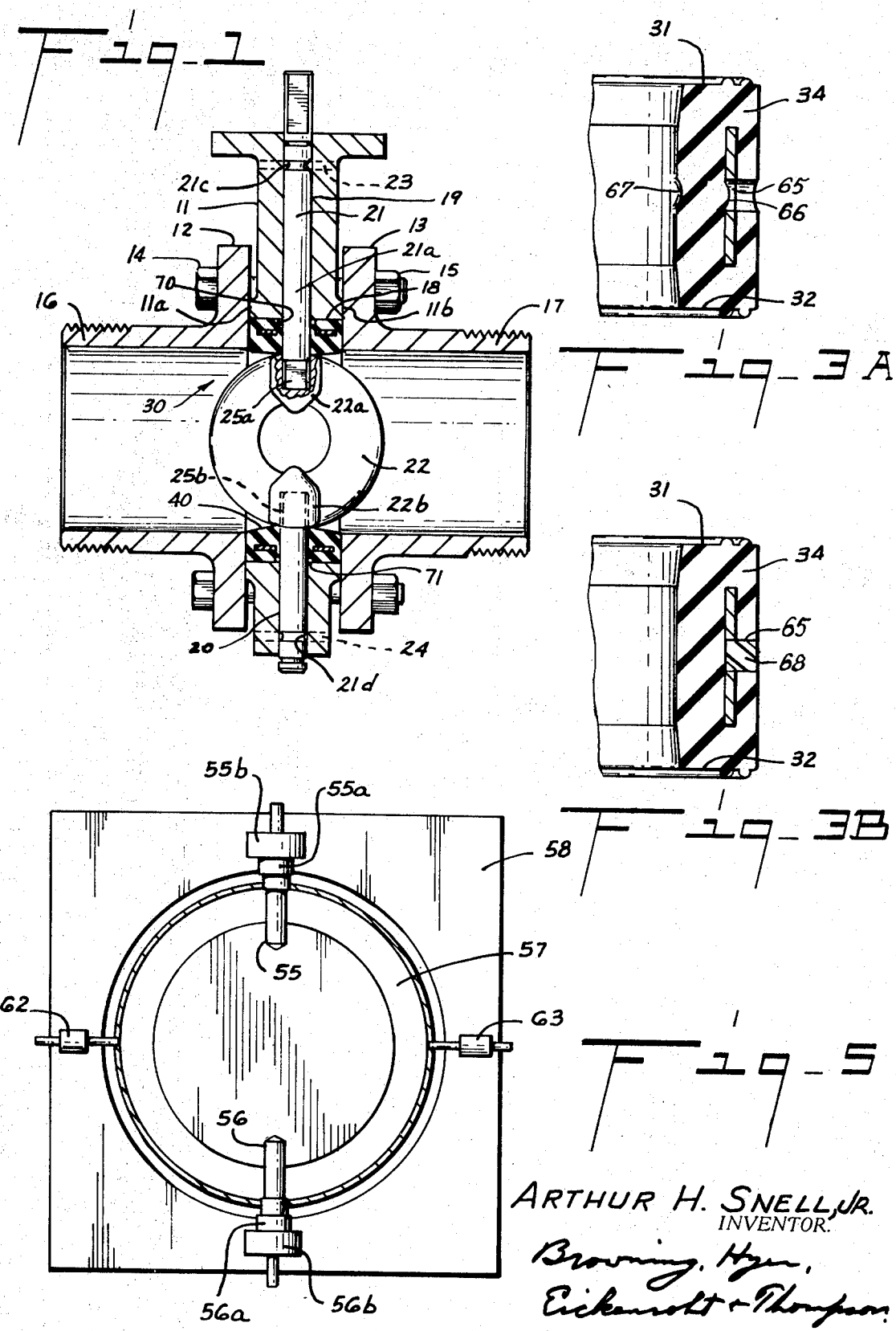

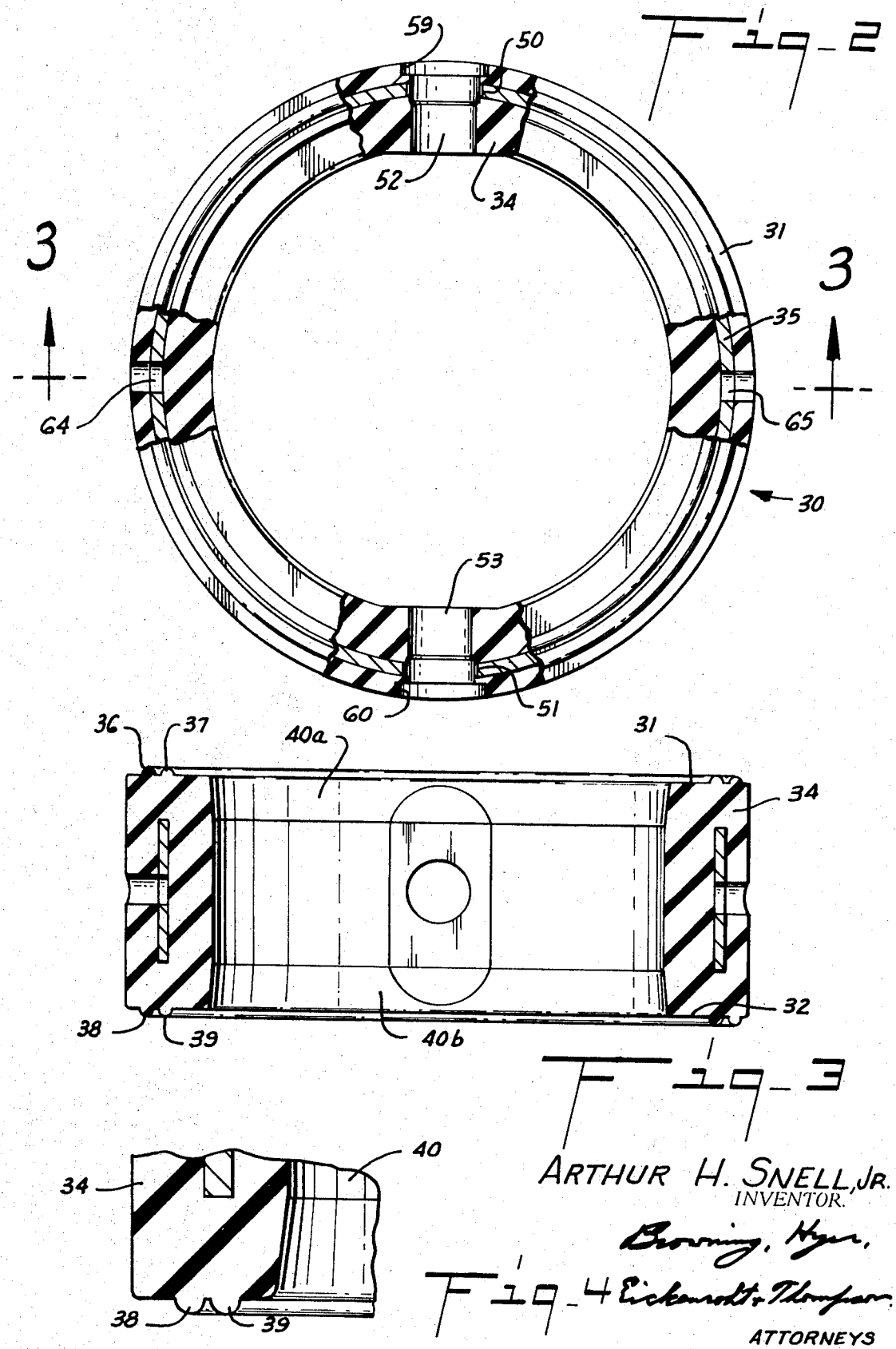

3,537,683
VALVE SEAT FOR A BUTTERFLY VALVE AND
METHOD FOR MAKING THE SAME
Arthur H. Snell, Jr., Houston, Tex., assignor to Keystone Valve Corp., Houston, Tex., a corporation of Texas
Continuation-in-part of application Ser. No. 697,817, Jan. 15, 1968. This application Nov. 4, 1968, Ser. No. 772,972
Int. Cl. F16k 1/22; B22c 9/24
U.S. Cl. 251—306             6 Claims

ABSTRACT OF THE DISCLOSURE

The valve seat is an annular body of rubber with a rigid tubular reinforcing member molded therein. The annular body is compressed longitudinally when in service and space is provided for the rubber displaced by this compression by beveling the bore of the seat adjacent each end. The reinforcing member for the seat is held in position in a mold cavity to be embedded in the rubber by four locating pins. Two pins extend across the cavity through openings in the member and form aligned openings in the seat to receive the valve stem. The other two locating pins extend into the cavity only far enough to engage openings in the member. The pins are spaced 90° apart around the mold to hold the member against movement during the molding of the rubber body in the annular cavity. The last-mentioned locating pins, when withdrawn after the molding operation, will leave small spaces or chambers extending from the outer surface of the rubber or elastomer portion of the seat into the openings in the reinforcing member, which may serve the useful purpose, in the event the openings through the reinforcing member extend all the way through, of providing an area the size of the opening through the reinforcing member which is bridged only by elastomer which is continuous over the opening in the reinforcing member inwardly thereof, and hence provides an area having definite limitations on the interior pressure within the valve which it will hold. Pressures exceeding such value will cause an outward bulge through the opening in the reinforcing member and cause the valve to leak past the disc at that point, thus providing both a definite safety limit beyond which the valve will leak, and a definite location at which leakage will occur. If this result is not desired, such opening or cavity may be filled and finished flush with the outside surface of the seat to prevent such bulging and leakage.

---

This application is a continuation-in-part of my copending application Ser. No. 697,817, filed Jan. 15, 1968, now abandoned, for Valve Seat for a Butterfly Valve and Apparatus for Making the Same.

This invention relates to butterfly valves. In one of its aspects, it relates to the valve seat for such a valve, and in yet another aspect, it relates to apparatus for making the seat for such a valve.

In butterfly valves or disc valves, as they are often called, the valve seat seals against the periphery of the disc to close off the flow passage through the valve. The seat also is compressed longitudinally between the mounting flanges to sealingly engage the flanges and keep the fluid passing through the valve from escaping between the flanges and the seat. Such valve seats are usually made of an elastomeric material, such as rubber. Also, usually, in the type of valve seat that is slidable endwise into and out of position in the valve body, a tubular reinforcing member of rigid material is embedded in the elastomeric material. The reinforcing member is shorter than the seat so that there will be a portion of the elastomeric material between the ends of the member and the flanges to be compressed therebetween to provide the seal between the seat and the flanges when the valve is in service. When the elastomeric material of the seat is compressed, a portion is displaced. This displaced material cannot flow outwardly to any extent due to the valve body. Therefore, it will bulge inwardly decreasing the diameter of the flow passage through the seat and increasing the eroding action of the fluid on the seat.

Therefore, it is an object of this invention to provide a valve seat for a butterfly valve that can be compressed longitudinally between mounting flanges without suffering a decrease in the original minimum flow passage through the seat even though there is an inward flow of displaced elastomeric material.

It is another object of this invention to provide a valve seat for a butterfly valve having projecting annular ridges integrally attached to its end faces to improve the seal formed between the seat and the mounting flanges when the seat is compressed therebetween, and which can accommodate the elastomeric material displaced when these annular ridges are forced into the main body of elastomeric material without decreasing the minimum diameter of the flow passage through the seat.

Where the valve seat is of the slip-in type and comprises an assembly of an annular body of rubber in which is embedded a rigid reinforcing member, openings must be provided in the reinforcing member to receive the valve stem that supports the disc within the valve seat. This means that when the rubber is molded around the tubular reinforcing member to form the valve seat assembly, the openings through the reinforcing member must be held accurately in position to coincide with the opening through the rubber body. This can be done by having aligned locating pins extending across the annular mold cavity in which the rubber is to be molded around the reinforcing member. These pins engage aligned holes on the opposite sides of the reinforcing member. The pins then form holes through the rubber that are in alignment with the holes in the reinforcing member. The reinforcing member, however, can move along the axis of the aligned pins and it can also rotate around this axis during the molding operation. It is important that the reinforcing member be symmetrically positioned in the annular body of rubber.

Therefore, it is another object of this invention to provide apparatus for molding such a valve seat for a butterfly valve that will hold a tubular reinforcing member in position in the mold cavity during the molding operation so that the reinforcing member is symmetrically located in the rubber body.

In the disc valves having such seats, pressure against one side of the disc when closed will be exerted not only against the disc, but also against the interior surface of the elastomer seat on the high pressure side of the disc and will tend to increase the internal pressure in such elastomer and cause it to flow toward the downstream side of the disc. When the differential between pressures on opposite sides of the disc is great enough, the elastomer will begin to flow past the outer edge of the disc and this flow will increase in extent until at some unknown pressure and at some unpredictable point around the circumference of the disc it will be forced away from the disc and allow the pressure on the upstream side to leak past. This action, however, as a rule requires a pressure substantially in excess of that for which the valve may be designed, and may be such as to exceed the strength of the valve body so that before pressure blows past the disc, it may even burst the valve body.

It is a further object of this invention, therefore, to provide a valve seat of the general character under discussion with means for reinforcing the valve seat about the periphery of the disc which reinforcing means is of such nature that a pressure may be quite accurately predetermined at which the material of the valve seat will be allowed to move away from the edge of the disc and hence to permit leakage, and to provide such a means whereby not only the pressure at which leakage will occur but the point around the periphery of the disc at which leakage will occur can be predetermined by the design of the valve and its seat.

A further object is to provide a method useful in making such seat and also in making a seat not having such predetermined essentially weaker leakage points.

The following description, taken with the accompanying drawing, sets forth by way of example and not limitation a preferred embodiment of the invention capable of carrying out and accomplishing the foregoing objects.

In the drawings:

FIG. 1 is a vertical, cross-sectional view of a butterfly valve installed between mounting flanges and equipped with the preferred embodiment of the valve seat of this invention;

FIG. 2 is a plan view of the valve seat of FIG. 1 with portions thereof broken away to show the tubular reinforcing member embedded therein;

FIG. 3 is a cross sectional view of the valve seat of FIG. 2 taken along line 3—3 of FIG. 2;

FIG. 3A is a view similar to the right-hand portion of FIG. 3 showing the bulging action of the elastomer through the hole 65 under pressure from the interior of the seat, so as to produce localized leakage under predetermined pressure conditions;

FIG. 3B is a view similar to FIG. 3A but showing the hole 65 after the same has been filled with a body of elastomer;

FIG. 4 is a fragmentary view on an enlarged scale of a portion of FIG. 3; and

FIG. 5 is a plan view of the lower half of the mold apparatus employed to manufacture the valve seat.

Referring to FIG. 1 of the drawings, valve body 11 is shown mounted between mounting flanges 12 and 13. Mounting bolts 14 and associated nuts 15 hold the flanges in metal to metal contact with end faces or surfaces 11a and 11b of the valve body. Mounting flanges 12 and 13 are integrally connected to threaded nipples 16 and 17 to provide fittings for securing the valve in a pipeline. Of course, connections other than threads can be used.

Connecting end faces 11a and 11b of the body is seat receiving opening 18. Transverse stem openings 19 and 20 extend through the body on opposite sides and intersect the seat receiving opening. These openings are in axial alignment to rotatably support the valve stem 21. The valve stem is in two sections, an upper section 21a and a lower section 21b, rotatably supported in openings 19 and 20, respectively.

The stem sections are held against axial movement by transverse pins 23 and 24, which engage grooves 21c and 21d in the two stem sections.

Located in seat receiving opening 18 of the valve body is valve seat assembly 30. The valve seat assembly comprises annular body 34 of elastomeric material preferably rubber, either natural or synthetic, and a tubular reinforcing member 35 of rigid material such as steel. The tubular reinforcing member is embedded in and completely surrounded by the elastomeric material of body 34. The seat assembly is slidable endwise into and out of seat receiving opening 18 in the body and is longer than the distance between end faces 11a and 11b of the body. This means that the seat will be compressed between the mounting flanges, when the flanges are pulled into metal to metal contact with the end faces of the valve body by the mounting bolts. So compressed, the valve seat will maintain a seal between the end faces of the seat itself, numbered 31 and 32 in the drawings, and the flanges to thereby prevent the escape of fluid from the pipeline between the seal and the flanges.

Mounted in bore 40 of the valve seat is valve disc 22. Hubs 22a and 22b are located on opposite sides of the disc and provided with sockets 25a and 25b to receive the ends of stem sections 21a and 21b, respectively. The ends of the stem sections and the sockets are square in cross section to provide a driving connection between the stem and the disc. The diameter of the disc at the hubs is such that the seat is compressed sufficiently to establish a seal between the seat and the hubs around the stem sections.

In the embodiment shown, the valve seat assembly is further provided with concentric annular ridges 36 and 37 on end faces 31 and concentric annular ridges 38 and 39 on end face 32 to improve the seal formed between the valve seat and the flanges when the seat is compressed therebetween. The annular ridges are semicircular in cross section. When the valve seat is compressed longtitudinally between mounting flanges 12 and 13, a certain amount of elastomeric material will be displaced laterally as the flanges are brought into metal-to-metal contact with the end faces of the valve body. An additional amount will be displaced laterally as the annular ridges are forced into the body of elastomeric material. This condition is shown in dotted lines in FIG. 4. The displaced material can move outwardly only a limited distance due to the closeness of the fit between the valve seat and the valve body. Most of the displaced material will move radially inward toward bore 40. To keep this material from bulging into the flow passage and decreasing the minimum diameter of bore 40, in accordance with this invention, bore 40 is beveled adjacent each end thereof to provide a space into which the displaced elastomeric material can flow without decreasing the minimum diameter of the bore. The angle of taper of beveled surfaces 40a and 40b, as shown in FIG. 3, and their length will be determined by the amount of elastormeric material which must be displaced in order for the flanges to move into metal-to-metal contact with the valve body. This is determined by how much longer the valve seat is than the distance between the end faces of the valve body and also by how much the protruding seal rings 36–39 extend out from the end faces and their diameter.

FIG. 5 illustrates the preferred apparatus for holding tubular reinforcing member 35, while it is being embeded in annular body 34 of elastomeric material, such as rubber. As best seen in FIG. 2, the reinforcing member is provided with openings 50 and 51. These openings are in axial alignment with valve stem openings 52 and 53, which are formed in rubber body 34 by locating pins 55 and 56, as shown in FIG. 5. Both of these pins extend across cavity 57 of the mold, of which lower section 58 is shown in FIG. 5. They have enlarged portions 55a and 56a which form O-ring grooves 59 and 60 (FIG. 2) in which are located O-rings 70 and 71, as shown in FIG. 1, when the valve is assembled. Portions 55b and 56b engage slots 58a and 58b in the bottom half of the mold and corresponding slots in the upper half to hold the pins in position during the molding process.

The reinforcing member, when mounted on pins 55 and 56, can move parallel to the longitudinal axes of the pins and also rotate around these axes. If the annular body of the seat is made of rubber, the uncured rubber is forced into cavity 57 under great pressure to cause it to conform to the shape of the cavity. This flowing rubber will move the reinforcing member unless it is rigidly held in place. Therefore, additional locating pins 62 and 63 are positioned to extend into cavity 57 and engage openings 64 and 65 in the reinforcing member. These openings can best be seen in FIG 3. These pins extend only far enough to engage the openings and, therefore, they do not form an opening all the way through the valve seat. With the pins so positioned, the reinforcing member is rigidly held in position in the annular cavity of mold 58 and will be accurately embedded in the body of rubber formed therein during the molding operation. In the embodiment shown, the locating pins are positioned so that the pins on opposite sides of the mold cavity are in axial alignment with the longitudinal axis of one pair intersecting the longitudinal axis of the other aligned pair at right angles.

The seat, after having been molded, as shown in FIGS. 2 and 3, has the openings 64 and 65 which are left upon withdrawal of the locating pins 62 and 63, these openings 64 and 65 extending from the exterior surface of the seat inwardly through the reinforcing member 35. Thus in each case such opening will provide a space substantially aligned with the plane of the valve closure disc when the same is in closed position. In each case this space will be separated from the pressured interior of the valve when the valve is closed, only by the thickness of elastomer inwardly from the inner end of the space 64 or 65. Under these circumstances, pressure from within the valve on one side of the closed disc will act outwardly against the layer of elastomer inwardly of the reinforcing member 35 to cause it to bulge into the opening 64 or 65 as the case may be, as indicated by lines 66 and 67 in FIG. 3A. This being a direct pressure acting over a known thickness of a known elastomer tending to press it into a space of known cross sectional area, it can be predetermined with accuracy at what interior pressure the elastomer of the seat inwardly from the openings 64 and 65 will yield outwardly under such pressure sufficiently to permit the fluid under pressure to leak past the disc between the disc and the seat. Thus not only the pressure at which leakage will begin can be predetermined, but also the point at which leakage will initially take place can be predetermined.

The valve seat thus described, by being provided with a portion yieldable at a predetermined pressure lower than that at which the valve would otherwise leak, secures the advantages and objects hereinbefore described. However, for those instances in which it is desired to avoid the weaker portion of the valve seat in order to be able to utilize pressures higher than those at which the valve seat at such selected leakage point would otherwise leak, it is possible to fill the openings radially outwardly from the reinforcing member with an incompressible material 68 (FIG. 3B), preferably elastomeric in nature, and having its outer surface flush with the outer surface of the remainder of the valve seat. This then would back up the elastomer overlying the opening in the reinforcing member and prevent the yielding of such overlying elastomer and consequently the localized leakage that would otherwise occur upon the attainment of a predetermined maximum pressure.

From the foregoing also it will be seen that the desirable valve seat having the reinforcing member completely surrounded with the elastomeric material may be produced by the advantageous method which involves providing the necessary holes in the reinforcing member, at least one of which and preferably two opposite and aligned holes of which will constitute stem receiving openings, and at least one other of which will constitute a supporting or stabilizing opening. Two of such holes in the reinforcing member will be substantially opposed to one another so as to provide essentially an axis across the reinforcing member supported at both ends, and the combination of this arrangement with the third hole circumferentially spaced from the first two, will prevent the reinforcing member from rotating about such axis and hence, when the reinforcing member is supported by engagement with such openings it may be supported within the cavity of a mold and out of contact with the walls of such caviy. Such support will be provided by a pin adapted to pass radially inwardly from the outer wall of the mold cavity into each of such openings, in the case of the stem opening or openings extending on through the same and to the inner wall of the cavity, and in the case of the stabilizing openings extending merely into the opening but terminating so that when the mold is filled there will be a layer of elastomer radially inwardly of the opening.

Then the mold cavity is filled with elastomer around such reinforcing member suspended therewithin out of contact with the walls of the cavity to produce the desired seat, and when this seat is removed from the cavity and the pins which support the reinforcing member therein are withdrawn, there will be left an opening or openings for the stem, and an opening or openings extending inwardly from the outer surface of the seat into the openings in the reinforcing member, but the elastomer will be continuous over such openings radially inwardly thereof so as to provide the yieldable sections heretofore described for the purpose of reducing leakage when a predetermined maximum pressure is attained.

For the purpose of producing a similar seat but eliminating the leakage factor just mentioned, one additional step in the method comprises the filling of the openings which permit the leakage with a substantially incompressible material such as, for example, the elastomer of which the seat is made. This may be accomplished by molding such body of material into each of these openings or by making a separate plug of such material and inserting and cementing it into the opening and finishing off the exterior flush with the outer surface of the seat.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed with reference to other features and subcombinations.

What is claimed is:

1. An annular valve seat for a butterfly valve, comprising a tubular reinforcing member of rigid material having two holes therein located in generally opposed relation to one another and a third hole located between the said two holes to receive a locating pin during the molding operation and an annular body of elastomer encompassing the reinforcing member, said elastomer body having at least one opening therethrough in alignment with one of said two holes to receive a valve stem when the seat is assembled in a valve body and another opening from the outside of said elastomer body into said third hole only and said elastomer body being continuous over said third hole inwardly of said reinforcing member.

2. A valve seat according to claim 1 in which said another opening is filled with substantially incompressible material to a surface flush with the exterior surface of said elastomer body.

3. A valve seat according to claim 2 in which said filling material is a plug of elastomer secured in said another opening.

4. A valve seat according to claim 1 in combination with a body having opposite end faces adapted to be engaged by flanges when clamped therebetween and a seat opening interconnecting said faces with said seat therein and a transverse stem intersecting said seat opening and in alignment with said one opening through the elastomer body to receive a valve stem, and a disc-type closure member within said seat of a size to compress the elastomeric material of the seat between the closure member and the reinforcing ring sufficiently to provide a seal between the closure member and the seat, the said compression being along a zone substantially in radial alignment with said third hole and said another opening in the elastomer, whereby under predetermined pressure from within the opening through said seat when said closure member is in sealing position the elastomer over said third hole will yield radially outwardly into said third hole and break said seal to permit leakage past said closure member.

5. The method of producing an annular elastomer valve seat for a butterfly valve adapted to leak under a predetermined internal pressure, in which there is a tubular reinforcing member of rigid material embedded in and completely surrounded by said elastomeric material, comprising forming more than two circumferentially spaced radially extending holes through a tubular reinforcing member of suitable size and material, sizing at least one of said holes to receive a valve stem and at least one other so that the expected thickness of elastomer inside the member bridging said hole will bulge radially outwardly through such hole a predetermined amount under said predetermined internal pressure, suspending said member in an annular mold cavity by pins projecting radially inwardly into said mold cavity and into each of said holes and, in the case of the said one other hole terminating short of the radially innermost wall of the mold cavity, filling the mold cavity with elastomer and causing the elastomer to congeal, and removing the congealed body from the mold cavity and the pins from said holes.

6. The method of producing an annular elastomer valve seat for a butterfly valve adapted to hold without leakage a predetermined internal pressure comprising the steps set forth in claim 5 to produce a valve seat as set forth in said claim, and filling with a substantially incompressible material to a surface flush with the exterior surface of the valve seat the hole left in the valve seat upon removing the pin from said other hole.

References Cited
UNITED STATES PATENTS

| | | | |
|---|---|---|---|
| 2,809,060 | 10/1957 | Thompson | 251—306 XR |
| 3,079,123 | 2/1963 | Freemantle | 251—306 |
| 3,118,465 | 1/1964 | Scaramucci | 251—362 XR |
| 3,314,641 | 4/1967 | Overbaugh | 251—148 |
| 3,341,170 | 9/1967 | Housworth | 251—306 |

HENRY T. KLINKSIEK, Primary Examiner

U.S. Cl. X.R.

249—57; 264—275